United States Patent
Binek et al.

(10) Patent No.: US 11,320,145 B2
(45) Date of Patent: May 3, 2022

(54) SUPPORT STRUCTURE FOR COMBUSTOR COMPONENTS AND METHOD OF USING SAME

(71) Applicant: United Technologies Corporation, Farmington, CT (US)

(72) Inventors: Lawrence A. Binek, Glastonbury, CT (US); Sean R. Jackson, Palm City, FL (US); Evan J. Butcher, Suffield, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 405 days.

(21) Appl. No.: 16/577,396

(22) Filed: Sep. 20, 2019

(65) Prior Publication Data

US 2021/0088213 A1    Mar. 25, 2021

(51) Int. Cl.
*F23R 3/00*    (2006.01)
*B33Y 10/00*    (2015.01)
*B33Y 80/00*    (2015.01)
*B22F 10/00*    (2021.01)

(52) U.S. Cl.
CPC .............. *F23R 3/002* (2013.01); *B22F 10/00* (2021.01); *B33Y 10/00* (2014.12); *B33Y 80/00* (2014.12); *F05D 2230/31* (2013.01); *F05D 2240/35* (2013.01)

(58) Field of Classification Search
CPC .. F23R 3/002; F23R 3/04; F23R 3/045; F23R 2900/00018; F23R 2900/03045; B33Y 10/00; B33Y 80/00; B22F 5/009; B22F 10/00; B22F 10/47; F05D 2230/30; F05D 2230/314
See application file for complete search history.

(56) References Cited

U.S. PATENT DOCUMENTS

| | | | |
|---|---|---|---|
| 9,808,865 B2 | 11/2017 | Rogers | |
| 10,941,937 B2* | 3/2021 | Kramer | F23R 3/002 |
| 11,137,140 B2* | 10/2021 | Mongillo, Jr | F23R 3/04 |
| 2015/0345298 A1* | 12/2015 | Mongillo | F01D 11/08 |
| | | | 60/755 |
| 2016/0290647 A1 | 10/2016 | Propheter-Hinckley | |
| 2018/0023409 A1 | 1/2018 | Lee | |
| 2018/0154446 A1 | 6/2018 | Brown | |
| 2018/0266689 A1 | 9/2018 | Kramer | |
| 2021/0355878 A1* | 11/2021 | Lundgren | F23R 3/002 |

FOREIGN PATENT DOCUMENTS

| | | |
|---|---|---|
| EP | 3301367 A1 | 4/2018 |
| WO | 2018199994 A1 | 11/2018 |

OTHER PUBLICATIONS

EP search report for EP20195161.3 dated Feb. 3, 2021.

\* cited by examiner

*Primary Examiner* — Jason H Duger
(74) *Attorney, Agent, or Firm* — Getz Balich LLC

(57) ABSTRACT

A method for forming a combustor of a gas turbine engine includes additively manufacturing a combustor wall of the combustor. The combustor wall includes a component, projecting from a surface of the combustor wall, and a support structure in communication with the component and the surface of the combustor wall. The support structure is a lattice structure.

20 Claims, 6 Drawing Sheets

SUPPORT STRUCTURE FOR COMBUSTOR COMPONENTS AND METHOD OF USING SAME

BACKGROUND

1. Technical Field

This disclosure relates generally to gas turbine engines, and more particularly to forming a combustor of a gas turbine engine.

2. Background Information

Modern gas turbine engines may frequently include one or more additively manufactured components. The additively manufactured components may require support structures configured to support overhanging surfaces of the components during the additive manufacturing process. For example, additively manufactured components may include monolithic support structures necessary for manufacturing the components. However, these monolithic support structures may be difficult to mechanically remove from the additively manufactured components subsequent to the additive manufacturing process. In some cases, the support structures may be left intact with the additively manufactured components and installed into the gas turbine engine. The support structures which remain in the gas turbine engine may obstruct fluid flow through parts of the engine, for example, fluid flow in connection with the combustor of the engine. Additionally, portions of the support structure may break away from their associated components during operation of the gas turbine engine, potentially striking portions of the turbine section of the engine. There is a need in the art, therefore, for improved systems and methods for additively manufacturing gas turbine engine components which address one or more of the above-noted concerns.

SUMMARY

According to an embodiment of the present disclosure, a method for forming a combustor of a gas turbine engine is provided. The method includes additively manufacturing a combustor wall of the combustor. The combustor wall includes a component, projecting from a surface of the combustor wall, and a support structure in communication with the component and the surface of the combustor wall. The support structure is a lattice structure.

In the alternative or additionally thereto, in the foregoing embodiment, the method further includes operating the gas turbine engine and directing a combustion flow through the combustor so as to remove at least a portion of the support structure with the combustion flow.

In the alternative or additionally thereto, in the foregoing embodiment, the lattice structure includes a plurality of lattice spars.

In the alternative or additionally thereto, in the foregoing embodiment, each spar of a first portion of the plurality of lattice spars has a first diameter and each spar of a second portion of the plurality of lattice spars has a second diameter different than the first diameter.

In the alternative or additionally thereto, in the foregoing embodiment, the first portion of the plurality of lattice spars is an interior portion of the support structure and the second portion of the plurality of lattice spars is an exterior portion of the support structure.

In the alternative or additionally thereto, in the foregoing embodiment, the second diameter is greater than the first diameter.

In the alternative or additionally thereto, in the foregoing embodiment, the component is a dilution chute extending through the combustor wall.

In the alternative or additionally thereto, in the foregoing embodiment, the support structure is in contact with an unsupported overhang surface of the component.

In the alternative or additionally thereto, in the foregoing embodiment, the unsupported overhang surface has an angle of at least 45 degrees with respect to the surface of the combustor wall.

In the alternative or additionally thereto, in the foregoing embodiment, the support structure, the component, and the combustor wall are made from a same material.

In the alternative or additionally thereto, in the foregoing embodiment, the combustor wall, the component, and the support structure are additively manufactured together as an integral unit.

According to another embodiment of the present disclosure, a combustor for a gas turbine engine includes a combustor wall including a surface, adjacent to combustion fluid within a combustion chamber of the combustor. A component projects from the surface of the combustor wall. A support structure is in contact with the component and the surface of the combustor wall. The support structure is a lattice structure.

In the alternative or additionally thereto, in the foregoing embodiment, the support structure includes a plurality of lattice spars.

In the alternative or additionally thereto, in the foregoing embodiment, each spar of a first portion of the plurality of lattice spars has a first diameter and each spar of a second portion of the plurality of lattice spars has a second diameter different than the first diameter.

In the alternative or additionally thereto, in the foregoing embodiment, the first portion of the plurality of lattice spars is an interior portion of the support structure and the second portion of the plurality of lattice spars is an exterior portion of the support structure.

In the alternative or additionally thereto, in the foregoing embodiment, the second diameter is greater than the first diameter.

In the alternative or additionally thereto, in the foregoing embodiment, the combustor wall is a liner panel of the combustor and the component is a dilution chute extending through the liner panel.

In the alternative or additionally thereto, in the foregoing embodiment, the support structure is in contact with an unsupported overhang surface of the component.

In the alternative or additionally thereto, in the foregoing embodiment, the unsupported overhang surface has an angle of at least 45 degrees with respect to the surface of the combustor wall.

According to another embodiment of the present disclosure, a method for forming a combustor of a gas turbine engine is provided. The method includes providing a combustor including a combustor wall including a surface, adjacent to combustion fluid, within a combustion chamber of the combustor, a component projecting from the surface of the combustor wall, and a support structure in contact with the component and the surface of the combustor wall. The method further includes operating the gas turbine engine and directing a combustion flow through the combustor so as to remove at least a portion of the support structure with the combustion flow. The support structure is a lattice structure.

The present disclosure, and all its aspects, embodiments and advantages associated therewith will become more readily apparent in view of the detailed description provided below, including the accompanying drawings.

DETAILED DESCRIPTION

Figure 1:
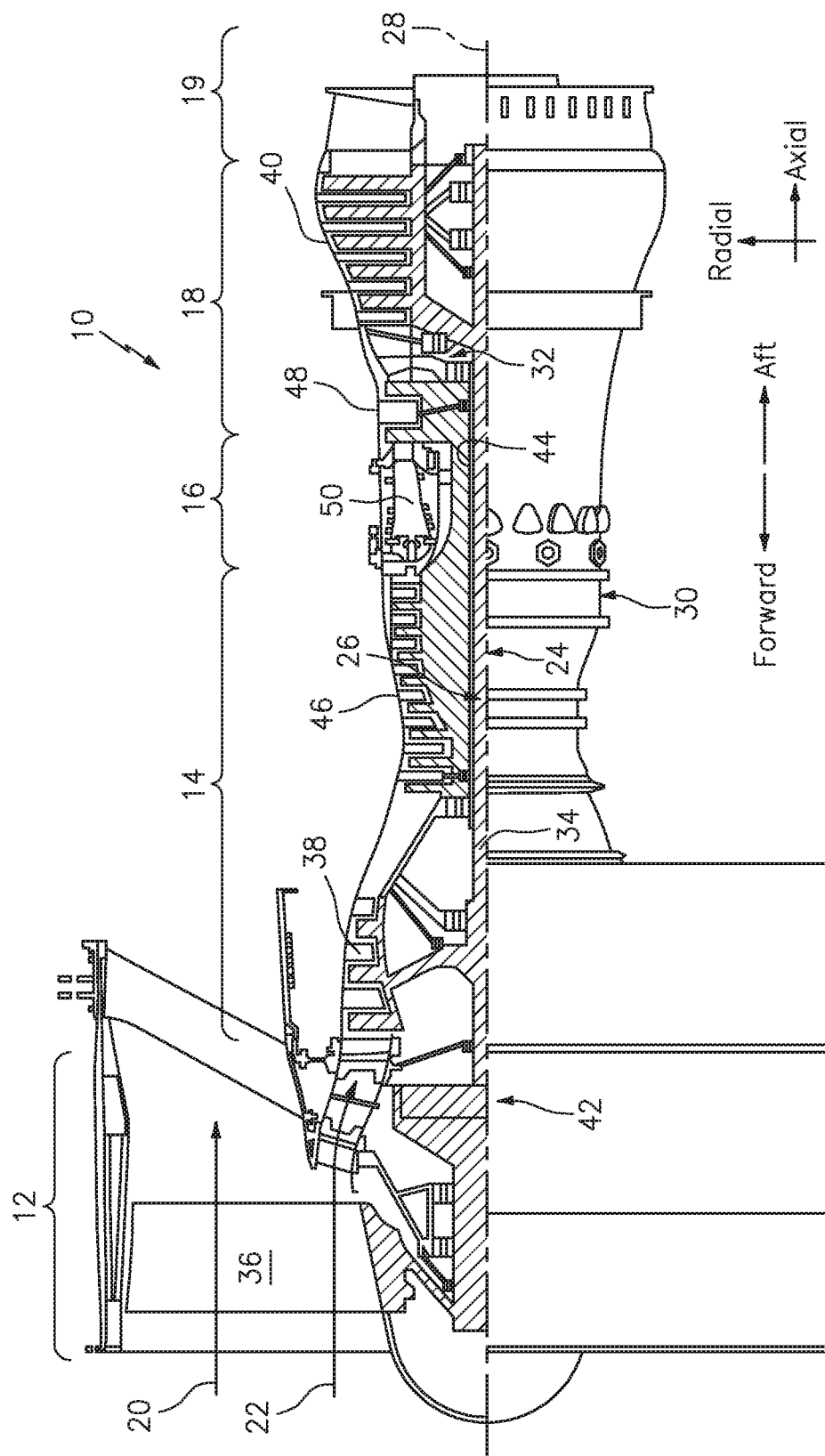
FIG. 1 illustrates a side cross-sectional view of a gas turbine engine in accordance with one or more embodiments of the present disclosure.

It is noted that various connections are set forth between elements in the following description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Referring to FIG. 1, an exemplary gas turbine engine 10 is schematically illustrated. The gas turbine engine 10 is disclosed herein as a two-spool turbofan engine that generally includes a fan section 12, a compressor section 14, a combustor section 16, a turbine section 18, and an exhaust section 19. The fan section 12 drives air along a bypass flowpath 20 while the compressor section 14 drives air along a core flowpath 22 for compression and communication into the combustor section 16 and then expansion through the turbine section 18. Although depicted as a turbofan gas turbine engine in the disclosed non-limiting embodiments, it should be understood that the concepts described herein are not limited to use with turbofans as the teachings may be applied to other types of turbine engines including those with three-spool architectures. The concepts described herein may additionally be applied to turbojet engines and, for example, expendable and attritable engines and/or aircraft. Attritable aircraft may include, for example, Unpiloted (or Unmanned) Aerial Vehicles (UAVs) and expendable turbojet systems for guided munitions, missiles, and decoys. Attritable aircraft may generally be designed as a limited lifetime vehicle, which can be a single use or single mission vehicle.

The gas turbine engine 10 generally includes a low-pressure spool 24 and a high-pressure spool 26 mounted for rotation about a longitudinal centerline 28 of the gas turbine engine 10 relative to an engine static structure 30 via one or more bearing systems 32. It should be understood that various bearing systems 32 at various locations may alternatively or additionally be provided.

The low-pressure spool 24 generally includes a first shaft 34 that interconnects a fan 36, a low-pressure compressor 38, and a low-pressure turbine 40. The first shaft 34 is connected to the fan 36 through a gear assembly of a fan drive gear system 42 to drive the fan 36 at a lower speed than the low-pressure spool 24. The high-pressure spool 26 generally includes a second shaft 44 that interconnects a high-pressure compressor 46 and a high-pressure turbine 48. It is to be understood that "low pressure" and "high pressure" or variations thereof as used herein are relative terms indicating that the high pressure is greater than the low pressure. A combustor 50 is disposed between the high-pressure compressor 46 and the high-pressure turbine 48 along the longitudinal centerline 28. The first shaft 34 and the second shaft 44 are concentric and rotate via the one or more bearing systems 32 about the longitudinal centerline 28 which is collinear with respective longitudinal centerlines of the first and second shafts 34, 44.

Airflow along the core flowpath 22 is compressed by the low-pressure compressor 38, then the high-pressure compressor 46, mixed and burned with fuel in the combustor 50, and then expanded over the high-pressure turbine 48 and the low-pressure turbine 40. The low-pressure turbine 40 and the high-pressure turbine 48 rotationally drive the low spool 24 and the high spool 26, respectively, in response to the expansion.

Figure 2:
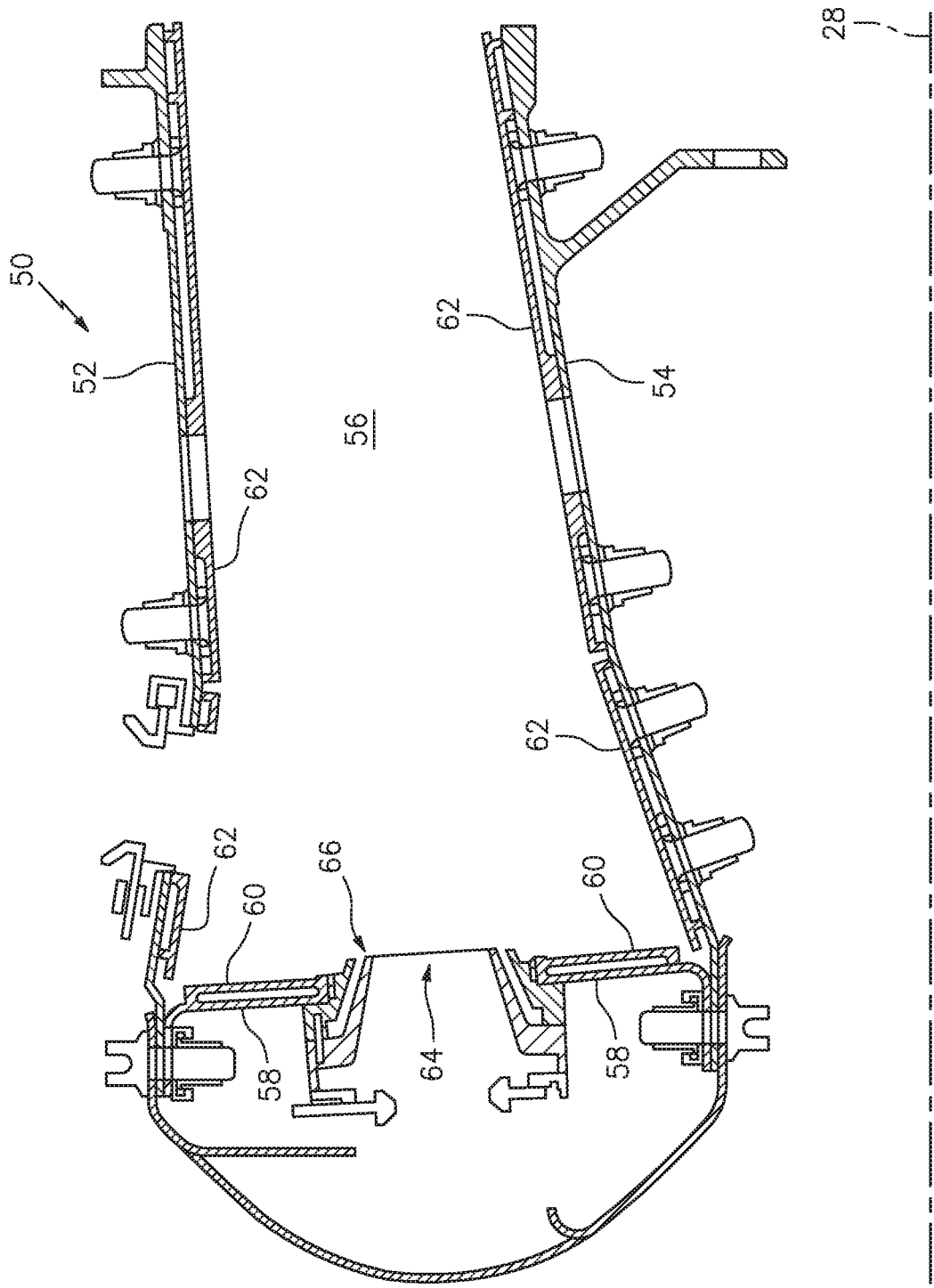
FIG. 2 illustrates an exemplary combustor for a gas turbine engine in accordance with one or more embodiments of the present disclosure.

Referring to FIG. 2, the combustor 50 may include an outer shell 52 and an inner shell 54 spaced radially inward of the outer shell 52, thereby defining a combustion chamber 56 therebetween. The combustor 50 may include a bulkhead 58 connecting the outer shell 52 and the inner shell 54. The combustor 50 may include a heat shield 60 mounted to the bulkhead 58 which may generally serve to thermally protect the bulkhead 58 and forward portions of the combustor 50. The combustor 50 may further include one or more liner panels 62 mounted to one or both of the outer shell 52 and the inner shell 54. An opening 64 may extend through the bulkhead 58. The opening 64 may be configured to receive a mixture of fuel and air for combustion in the combustion chamber 56 forming a heated combustion flow through the combustor 50. Fuel, air, and other fluids provided by a fuel injector (not shown) may pass through a swirler 66 which may extend through the opening 64.

Figure 3:
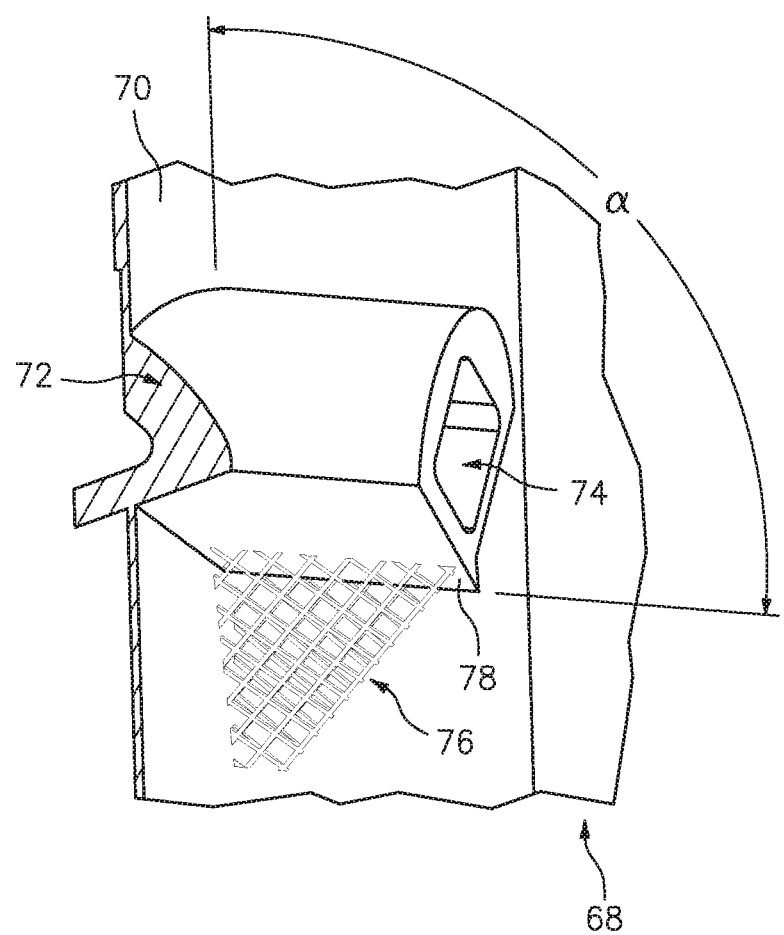
FIG. 3 illustrates a perspective view of combustor wall with a support structure in accordance with one or more embodiments of the present disclosure.
Figure 4:
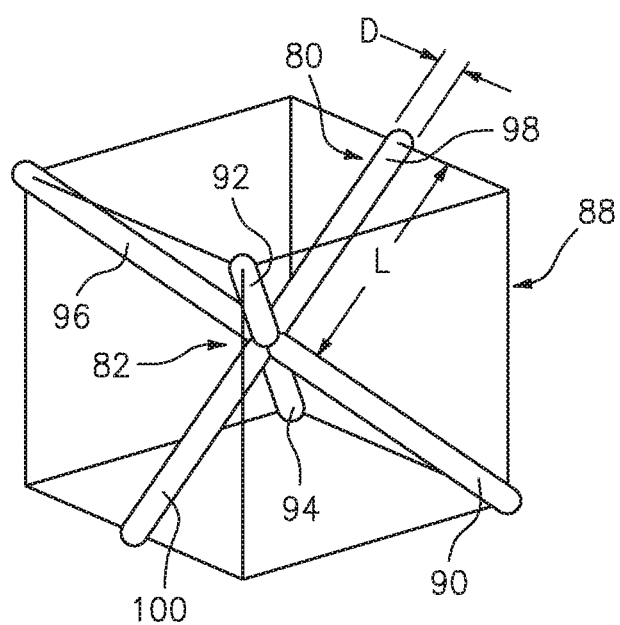
FIG. 4 illustrates a portion of an exemplary lattice structure in accordance with one or more embodiments of the present disclosure.
Figure 5:
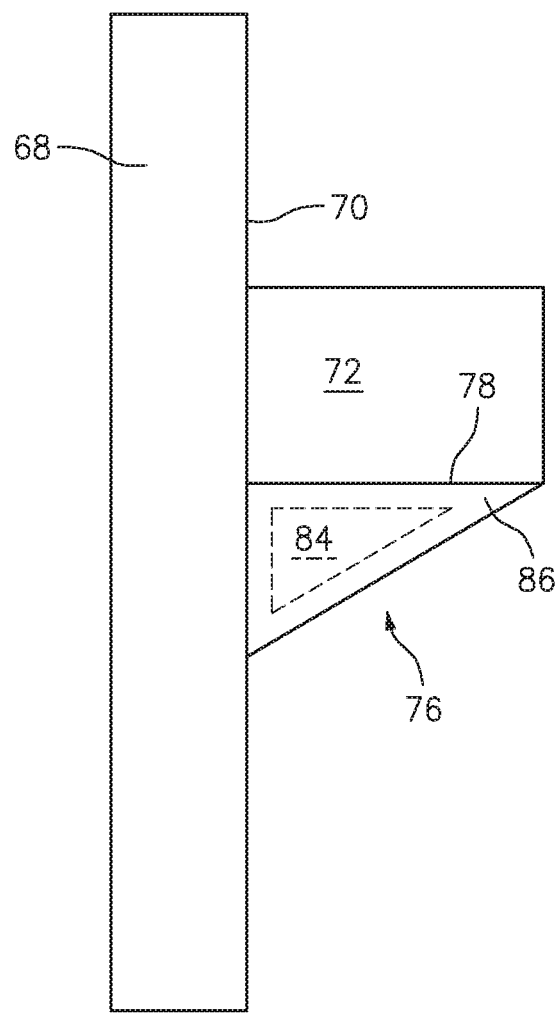
FIG. 5 illustrates a side, cross-sectional view of a combustor wall with a support structure in accordance with one or more embodiments of the present disclosure.

Referring to FIG. 3-5, the combustor 50 includes a combustor wall 68 which may form all or a portion of, for example, the shells 52, 54, the bulkhead 58, the heat shield 60, or the one or more liner panels 62 of the combustor 50. The combustor wall 68 includes a surface 70 configured to be in fluid communication with the combustion flow of the combustor 50. For example, the surface 70 may be adjacent to combustion fluid within the combustion chamber 56. For further example, the surface 70 may face the combustion chamber 56 and may define an outer boundary of the combustion chamber 56. The combustor wall 68 includes at least one component 72 projecting from the surface 70 of the combustor wall 68 (e.g., the component 72 may project from the surface 70 into the combustion chamber 56). In various embodiments, the component 72 may be, for example, a dilution chute forming defining a passage 74 through the combustor wall 68. However, aspects of the present disclosure may benefit any additively manufactured feature or component which may require build supports during the additive manufacturing process.

The combustor wall 68 and the component 72 may be additively manufactured. During additive manufacturing of the combustor wall 68 and component 72, the component 72 may include one or more surfaces which are overhanging surfaces (i.e., surfaces of additively manufactured workpieces which extend outward beyond the previous additively manufactured layer of the workpiece). Overhanging surfaces may be prone to curling, sagging, delamination, or collapsing. Accordingly, the combustor wall 68 may include a support structure 76 in communication with the component 72 and the surface 70 of the combustor wall 68. For example, the support structure 76 may be additively manufactured with the combustor wall 68 and the component 72 and may support an overhanging surface 78 of the component 72. In various embodiments, the combustor wall 68, the component 72, and the support structure 76 may be additively manufactured together as an integral unit. The overhanging surface 78 may be disposed at an overhang angle α with respect to the surface 70 of the combustor wall 68. For example, the overhanging surface 78 may be disposed at an overhang angle α of at least 45 degrees with respect to the surface 70 of the combustor wall 68.

In various embodiments, the support structure 76 is configured as a lattice structure. The support structure 76 may include a plurality of lattice spars 80 connected to one another as a repeated pattern of lattice spars to form the lattice structure. For example, as shown in FIG. 4, the support structure 76 may be configured to have two or more lattice spars of the plurality of lattice spars 80 connected to one another at a node 82 (e.g., a center point) to form a spar assembly 88. In the illustrated embodiment, the spar assembly 88 includes six lattice spars 90, 92, 94, 96, 98, 100 of the plurality of lattice spars 80 radially extending from the node 82. Adjacent lattice spars, for example, lattice spars 90, 92, extend from the node 82 at substantially 90° angles relative to one another. The ends of any three adjacent lattice spars, for example, lattice spars 90, 92, 98, which are at opposing ends of the lattice spars 90, 92, 98 relative to the node 82, may form an abstract triangle. Taking all eight sets of three adjacent lattice spars and the resulting abstract triangle from each set of three adjacent lattice spars may form an abstract 3-dimensional shape, which may be referred to as a square bipyramid.

Each lattice spar of the plurality of lattice spars 80 may have a length L and a diameter D. Each lattice spar of the plurality of lattice spars 80 may have, for example, a diameter D of 0.01 inches. In various embodiments, each lattice spar of the plurality of lattice spars 80 may have a diameter D from 0.005 inches to 0.02 inches, inclusive. In various embodiments, each lattice spar of the plurality of lattice spars 80 may have a diameter D smaller than 0.005 inches. In various embodiments, each lattice spar of the plurality of lattice spars 80 may have a diameter D larger than 0.02 inches. Each lattice spar of the plurality of lattice spars 80 may have, for example, a length L of 0.05 inches. In various embodiments, each lattice spar of the plurality of lattice spars 80 may have a length L from 0.03 inches to 0.1 inches, inclusive. In various embodiments, each lattice spar of the plurality of lattice spars 80 may have a length L smaller than 0.03 inches. In various embodiments, each lattice spar of the plurality of lattice spars 80 may have a length L larger than 0.1 inches. In various embodiments, the spar assembly 88 includes more than six lattice spars of the plurality of lattice spars 80. In various embodiments, the spar assembly 88 includes fewer than six lattice spars of the plurality of lattice spars 80. In various embodiments, two adjacent lattice spars of the spar assembly 88 may extend from the node 82 at an angle more than 90° relative to one another. In various embodiments, two adjacent lattice spars of the spar assembly 88 may extend from the node 82 at an angle less than 90° relative to one another. The support structure 76 may be made from a same material as one or both of the combustor wall 68 and the component 72 (e.g., a same metal, alloy, or superalloy material) such as, but not limited to aluminum, titanium, copper, cobalt, iron, nickel, and alloys thereof. In various other embodiments, the support structure 76 may be configured as an additively manufactured foam.

In various embodiments, the support structure 76 may be configured to allow the combustion flow to pass through the support structure 76 during an operation of the gas turbine engine 10. Passage of the heated combustion flow gases through the support structure 76 may cause the support structure 76 to quickly erode and be carried with the combustion flow. As a result, all or at least a portion of the support structure 76 may be removed from the combustor 50 and may exit the gas turbine engine 10 via the exhaust section 19.

In various embodiments, the support structure 76 may be configured to include portions which may be more readily eroded by the combustion flow than other portions of the support structure 76. Such a configuration may prevent or minimize the erosion and subsequent release of relatively large pieces of the support structure 76 which may impact downstream components such as turbine nozzles or other components of the turbine section 18. For example, in various embodiments, each spar of a first portion 84 of the plurality of lattice spars 80 may have a first diameter and a first length while each spar of a second portion 86 of the plurality of lattice spars 80 may have a second diameter and a second length. The first diameter and the first length may be different than one or both of the second diameter and the second length, respectively. As shown in FIG. 5, in various embodiments, the first portion 84 of the plurality of lattice spars 80 may be an interior portion of the support structure 76 while the second portion 86 of the plurality of lattice spars 80 may be an exterior portion of the support structure 76 (e.g., the second portion 86 may encompass all or a portion of the first portion 84). In various embodiments, the second diameter of the second portion 86 forming the exterior portion of the support structure 76 may be greater than the first diameter of the first portion 84 forming the interior portion of the support structure 76.

Figure 6:
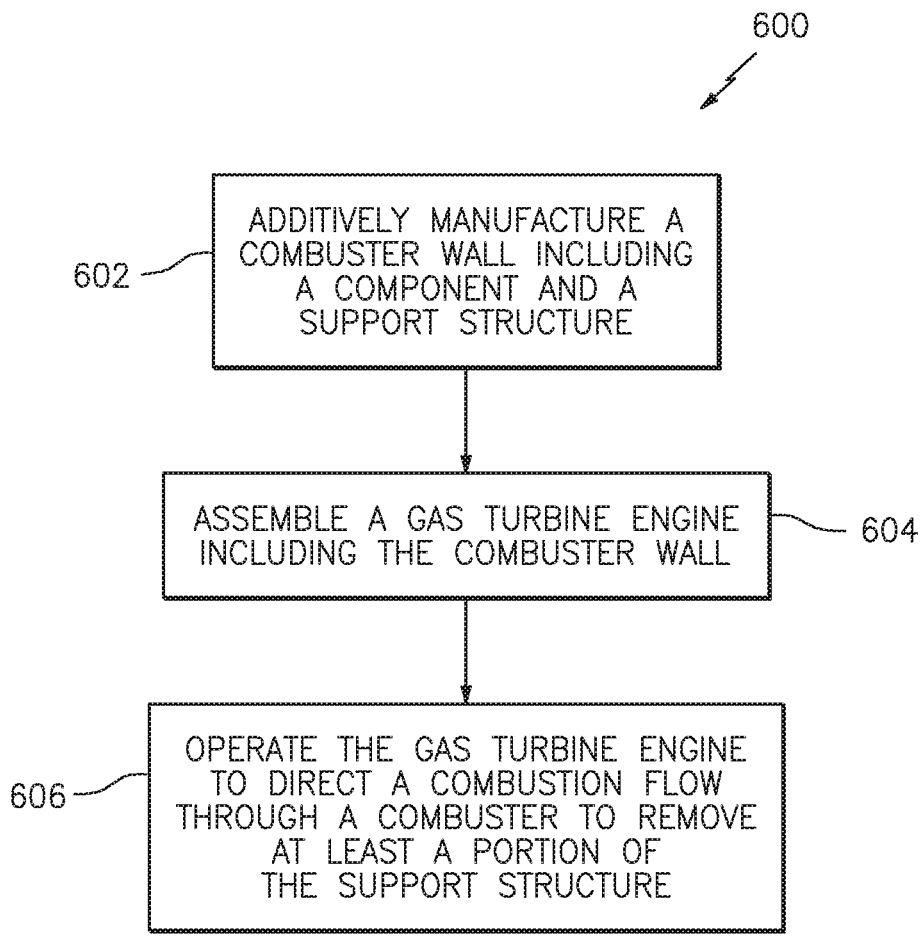
FIG. 6 is a flowchart depicting a method for forming a combustor of a gas turbine engine in accordance with one or more embodiments of the present disclosure.

Referring to FIG. 6, a method 600 for forming a combustor 50 of a gas turbine engine 10 is disclosed. In Block 602, the combustor wall 68 of the combustor 50 is additively manufactured by, for example, direct metal laser sintering (DMLS), laser powder bed fusion, electron beam melting, glue binder jetting, or any other suitable method of additive manufacturing. The combustor wall 68 includes the component 72, projecting from the surface 70 of the combustor wall 68, and a support structure 76 in communication with the component 72 and the surface 70 of the combustor wall 68 for supporting the overhanging surface 78 of the component 72. As discussed above, the combustor wall 68, the component 72, and the support structure 76 may be additively manufactured together as a single integral unit. In Block 604, the gas turbine engine 10 is assembled and includes the combustor wall 68 having the component 72 and the support structure 76. In Block 606, the gas turbine engine 10 is operated (e.g., an initial operation of the gas turbine engine 10) and a combustion flow is directed through the combustor 50. The combustion flow passes through the support structure 76 causing the support structure 76 to erode and be carried with the combustion flow through and out of the gas turbine engine 10. Accordingly, all or at least a portion of the support structure 76 is removed from the combustor wall 68 and the component 72. In various embodiments, portions of the support structure 76 may remain in contact with one or both of the combustor wall 68 and the component 72 subsequent to operation of the gas turbine engine 10. Accordingly, additional operation of the gas turbine engine 10 may be necessary to completely remove the support structure 76 from the gas turbine engine 10. In various embodiments, one or more additional methods may be used to further remove the support structure 76 from the combustor wall 68 and the component 72, such as mechanical abrasion, chemical removal, etc.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

What is claimed is:

1. A method for forming a combustor of a gas turbine engine, the method comprising:
additively manufacturing a combustor wall of the combustor, the combustor wall including a component, projecting from a surface of the combustor wall, and a support structure in communication with the component and the surface of the combustor wall;
wherein the support structure is a lattice structure.

2. The method of claim 1, further comprising operating the gas turbine engine and directing a combustion flow through the combustor so as to remove at least a portion of the support structure with the combustion flow.

3. The method of claim 2, wherein the lattice structure includes a plurality of lattice spars.

4. The method of claim 3, wherein each spar of a first portion of the plurality of lattice spars has a first diameter and each spar of a second portion of the plurality of lattice spars has a second diameter different than the first diameter.

5. The method of claim 4, wherein the first portion of the plurality of lattice spars is an interior portion of the support structure and the second portion of the plurality of lattice spars is an exterior portion of the support structure.

6. The method of claim 5, wherein the second diameter is greater than the first diameter.

7. The method of claim 1, wherein the component is a dilution chute extending through the combustor wall.

8. The method of claim 1, wherein the support structure is in contact with an unsupported overhang surface of the component.

9. The method of claim 8, wherein the unsupported overhang surface has an angle of at least 45 degrees with respect to the surface of the combustor wall.

10. The method of claim 1, wherein the support structure, the component, and the combustor wall are made from a same material.

11. The method of claim 1, wherein the combustor wall, the component, and the support structure are additively manufactured together as an integral unit.

12. A combustor for a gas turbine engine, the combustor comprising:
a combustor wall comprising a surface, adjacent to combustion fluid within a combustion chamber of the combustor;
a component projecting from the surface of the combustor wall; and
a support structure in contact with the component and the surface of the combustor wall,
wherein the support structure is a lattice structure.

13. The combustor of claim 12, wherein the support structure includes a plurality of lattice spars.

14. The combustor of claim 13, wherein each spar of a first portion of the plurality of lattice spars has a first diameter and each spar of a second portion of the plurality of lattice spars has a second diameter different than the first diameter.

15. The combustor of claim 14, wherein the first portion of the plurality of lattice spars is an interior portion of the support structure and the second portion of the plurality of lattice spars is an exterior portion of the support structure.

16. The combustor of claim 15, wherein the second diameter is greater than the first diameter.

17. The combustor of claim 12, wherein the combustor wall is a liner panel of the combustor and the component is a dilution chute extending through the liner panel.

18. The combustor of claim 12, wherein the support structure is in contact with an unsupported overhang surface of the component.

19. The combustor of claim 18, wherein the unsupported overhang surface has an angle of at least 45 degrees with respect to the surface of the combustor wall.

20. A method for forming a combustor of a gas turbine engine, the method comprising:
providing a combustor comprising:
a combustor wall comprising a surface, adjacent to combustion fluid within a combustion chamber of the combustor;
a component projecting from the surface of the combustor wall; and
a support structure in contact with the component and the surface of the combustor wall; and
operating the gas turbine engine and directing a combustion flow through the combustor so as to remove at least a portion of the support structure with the combustion flow,
wherein the support structure is a lattice structure.

* * * * *